Nov. 10, 1964    J. S. TARBUTTON    3,156,910
TELEMETERING SYSTEM
Filed Aug. 10, 1959    5 Sheets-Sheet 1

INVENTOR
J. S. TARBUTTON

BY
ATTORNEYS

Nov. 10, 1964     J. S. TARBUTTON     3,156,910

TELEMETERING SYSTEM

Filed Aug. 10, 1959     5 Sheets-Sheet 2

INVENTOR
J. S. TARBUTTON

BY
ATTORNEYS

FIG. 4A

INVENTOR
J. S. TARBUTTON

Nov. 10, 1964   J. S. TARBUTTON   3,156,910
TELEMETERING SYSTEM
Filed Aug. 10, 1959   5 Sheets-Sheet 5

INVENTOR
J. S. TARBUTTON

BY *Agatis Dowell & ...*
ATTORNEYS 3,156,910
TELEMETERING SYSTEM
James S. Tarbutton, Ruston, La.
Filed Aug. 10, 1959, Ser. No. 832,853
8 Claims. (Cl. 340—345)

This invention relates to telemetering of information. More particularly, this invention relates to the telemetering of information from a rotating shaft to provide for recording or display of the information.

Heretofore, various attempts have been made to measure and record the strains of a rotating shaft. One prior device employed a mechanical extensometer consisting of levers that magnify the minute strains and cause a needle to turn so as to provide a dial reading. The bulk of this system can be reduced and greater sensitivity achieved through use of mirrors and light beams. It has been found that this system is not practicable for use on rotating shafts.

Another prior device employs mirrors mounted directly on the shaft. The deflection produced by shaft twist produces an angle between light beams which are directed at the meters, and which are originally in alignment. Photoelectric cells or cameras are used for detecting and recording the magnitude of the light beam deflections. Vibrations produced by the rotation of the shaft tend to destroy the calibration of the meters, with resultant inaccuracy in the readings.

Another prior system employs slip rings and electric strain gauges. The gauges are attached to the rotating shaft so that their resistance will change in proportion to the strain of the material of the shaft. A Wheatstone bridge, or other similar device, is employed to measure the changing resistance. Slip rings are employed to connect the rotating strain gauges with the stationary meters. With this arrangement, contact resistance becomes a major factor, since this is as much or more than the resistance change in the electric strain gauge. Another difficult design problem is presented in securing the leads from the strain gauge to the slip rings. Two slip rings per lead have been employed with a modified Wheatstone bridge structure to compensate for brush contact resistance. It has frequently been necessary to drill out the center of the shaft to get the leads through the bearings.

The present invention overcomes the difficulties of the prior devices because the information is transmitted by radio waves, thus avoiding the shortcomings of slip rings, mirrors or other mechanical devices and their accompanying inaccuracies and limitations.

The present invention overcomes the inherent shortcomings of the prior art devices by providing a radio transmitter adapted to be mounted in a housing which is adjustable in size for mounting on shafts of various sizes.

The transmitter including the circuitry and housing is of sturdy, balanced construction and is so arranged and mounted as to resist centrifugal force, shocks, and vibration which normally occur in rotating machinery.

Further, the present invention provides a miniaturized compact electronic circuit for sampling the strain of rotating members by the use of electrical strain gauges; modulating the frequency of a carrier wave with the signals from the strain gauges; and, radiating the modulated signal.

It is an object of the present invention to provide an efficient, accurate telemetering system for transmitting information from a rotating shaft and recording or displaying this information in usable form.

A further object of the invention is to provide a transmitter that can be secured to a rotating shaft for transmitting intelligence from the shaft for reception by an appropriate receiver.

Another object of the invention is to provide a miniaturized transmitter circuit of sturdy construction so as to withstand the centrifugal force and vibrations produced by high-speed rotation when the transmitter is secured to a rotating shaft.

A further object of the invention is to provide a transmitter for producing a carrier wave having its frequency modulated in proportion to the strain on a rotating shaft, and delivering the modulated wave to an antenna where it is radiated for reception by a frequency meter.

A further object of the invention is to provide an efficient method for measuring and telemetering the strain of rotating shafts.

Another object of the invention is to provide a transmitter designed to be secured to shafts of various sizes in a rigid fashion.

Another object of the invention is to provide a voltage-tunable radio-frequency oscillator comprising a diode acting as a variable capacitor.

Further objects and advantages of the invention will be apparent upon reading the following description of a physical embodiment illustrated in the drawings.

Briefly stated, the telemetering system of the invention includes a transmitter and a receiver. The transmitter includes an annular housing with the circuit components sturdily mounted therein in balanced configuration so as to withstand the vibrations and shocks produced during rotation. The transmitter circuit comprises a battery-powered transistorized square wave generator for producing an alternating current carrier wave. The amplitude of this carrier wave is modulated by a strain gauge bridge including four strain gauges. Two of these strain gauges are mounted inside the transmitter to compensate for resistance changes due to temperature.

The other two strain gauges are secured to the rotating shaft so that they will be strained as the shaft is strained and change resistance proportionally. The modulated carrier wave is amplified by several amplifier stages and the amplified signal rectified and, optionally, integrated to give average values. The signal is then applied as a controlling signal to modulate the frequency of a voltage-tunable radio frequency oscillator. The frequency-modulated radio-frequency wave is delivered to an antenna where it is radiated into space.

A stationary receiver, such as a frequency meter, is located nearby to receive the signal from the transmitter. The frequency meter can be calibrated directly according to the strain of the rotating shaft.

Figure 1:
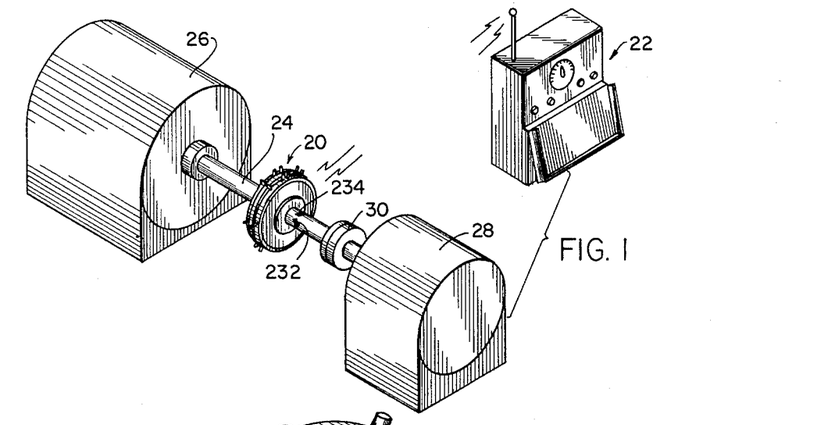
FIG. 1 is a perspective view of a telemetering system according to the invention.

Referring to the drawings, and particularly to FIG. 1, the telemetering system includes a transmitter 20 and a receiver 22 in the form of a frequency meter. The transmitter 20 is releasably mounted on a rotating shaft 24 connecting an electric motor 26 to an electric generator 28 through a coupling 30.

Figure 2:
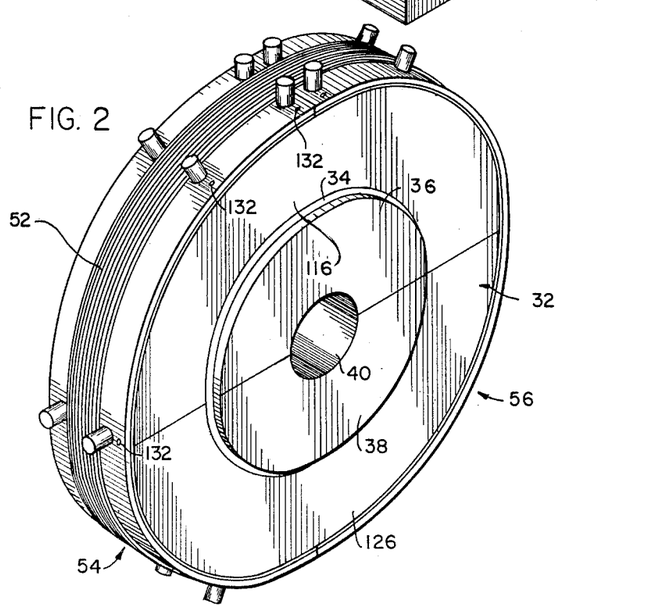
FIG. 2, a perspective view of the transmitter employed in the telemetering system of FIG. 1 and shown in an enlarged scale detached from the shaft.

The transmitter 20 comprises an annular housing portion 32 surrounding an inner bushing 34 formed from two mating hemi-cylindrical parts 36 and 38 releasably secured together by bolts. The bushing parts 36 and 38 having mating hemi-cylindrical grooves formed therein to produce a circular cylindrical aperture 40 in the center of the transmitter 20 for receiving the shaft 24.

A variety of clamping bushings 34 can be employed having central openings of different sizes. In this way, the annular portion 32 of the transmitter can be used on shafts of various diameters.

Figure 3:
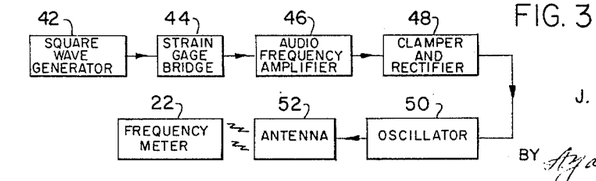
FIG. 3, a block diagram of the electronic aspects of the telemetering system shown in FIG. 1.
Figure 5:
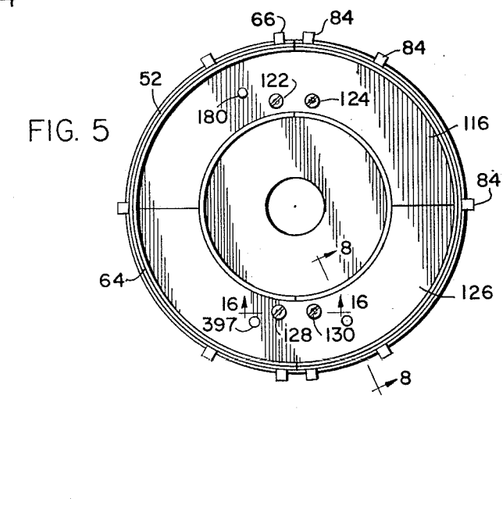
FIG. 5, a front elevation view of the transmitter shown in FIG. 2.
Figure 6:
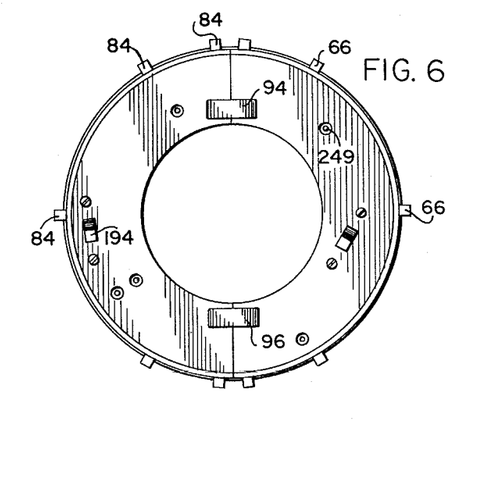
FIG. 6, a rear elevation view of the transmitter shown in FIG. 2.

The broad electronic aspects of the telemetering system are outlined in the block diagram of FIG. 3. Functionally, the transmitter includes an alternating electrical power source in the form of a square wave generator 42, a strain gauge bridge 44, an audiofrequency amplifier 46, a clamper and rectifier circuit 48, an oscillator 50 and an antenna 52. The frequency meter 22 receives the signal radiated by the antenna 52. The foregoing elements of the transmitter are housed in the annular housing portion 32 of the transmitter 20. Structurally, the annular housing portion 32 is disc-shaped and is formed from two aluminum mating halves generally indicated by the numerals 54 and 56 in FIG. 7. The transmitter half 54 includes an inner hemi-cylindrical wall 58 and an outer hemi-cylindrical wall 60. A rear plate 62 connects one edge of the inner wall 58 to the opposed edge of the outer wall 60. A hemi-cylindrical plastic insulator 64 is secured to the outer surface of the outer wall 60 for insulating the antenna 52 from the wall 60. As seen in FIGS. 5 and 6, a plurality of spaced bolts 66 extend through the plastic insulator 64 into the outer wall 60 and serve to secure the plastic insulator element 64 to the wall 60. These bolts 66 also serve to maintain the antenna wire 52 in its coiled position around the outer surface of the transmitter.

Figure 7:
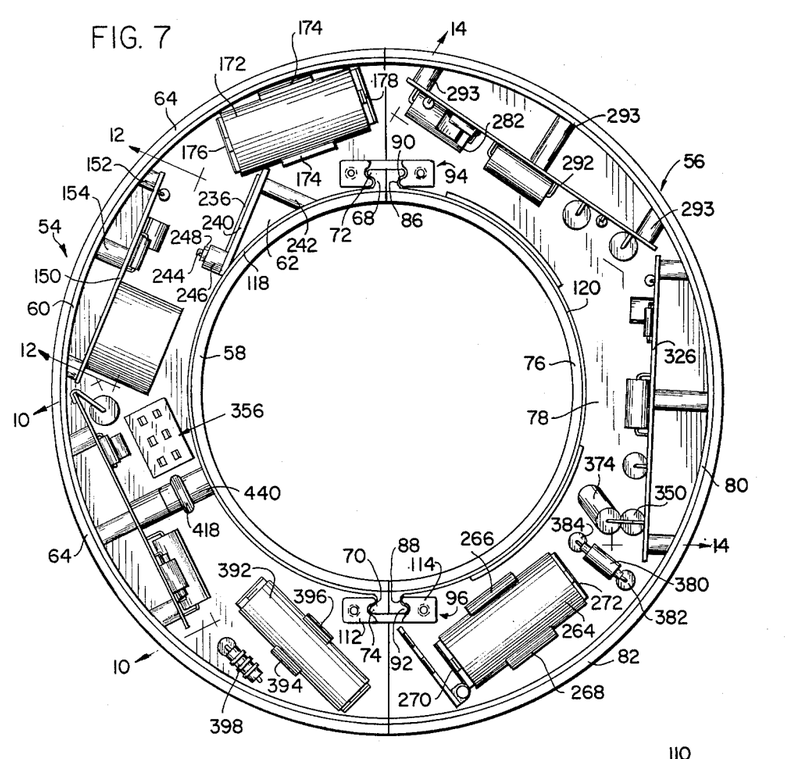
FIG. 7, a vertical section through the transmitter shown in FIG. 2.

The inner wall 58 has a pair of lugs 68 and 70 formed at its opposite ends. The lug 68 has a cantilever portion 72. Similarly, the lug 70 has a cantilever portion 74.

Similarly, the transmitter half 56 includes an inner hemi-cylindrical wall 76 having one end secured to a rear plate 78 having its outer edge secured to an outer hemi-cylindrical wall 80. A hemi-cylindrical plastic insulator 82 is secured to the outer surface of the outer wall 80 and is formed of a non-conducting synthetic resin. A plurality of insulated bolts 84 extend through the insulator element 82 and secure it to the outer wall 80. These bolts 84 are wrapped with a layer of non-conducting synthetic resin plastic and serve also to maintain the antenna wire 52 in its coiled position on the outer surface of the transmitter. The inner wall 76 has a pair of lugs 86 and 88 formed at its opposite ends. The lug 86 has a cantilever portion 90, and the lug 88 has a similar cantilever portion 92.

Figure 9:
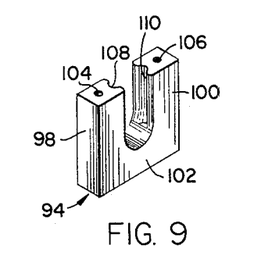
FIG. 9, a perspective of one of the clamps employed in assembling the transmitter shown in FIGS. 2 and 7.
Figure 10:
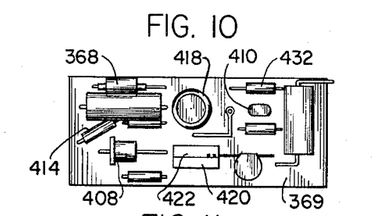
FIG. 10, a fragmentary section taken along the line 10—10 in FIG. 7 and illustrating the radio frequency oscillator circuit card.
Figure 11:
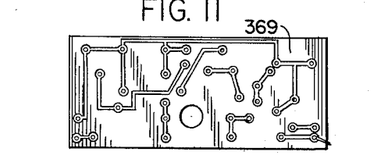
FIG. 11, a bottom view of the radio frequency oscillator circuit card shown in FIG. 10.

As seen in FIGS. 6 and 7, the two transmitter halves 54 and 56 are releasably held together by two clamps 94 and 96. The clamp 94 is illustrated in FIG. 9 and is generally U-shaped. This clamp 94 includes two legs 98 and 100 bridged by a base portion 102. The legs 98 and 100 have parallel threaded holes 104 and 106 formed therein for engagement by screws subsequently described. The inner surface of leg 98 has a groove 108 formed therein to engage the cantilever portion 72 of lug 68 formed on transmitter F54. Similarly, the clamp leg 100 has a groove 110 formed on its inner surface to engage the cantilever portion 90 on lug 86 formed in transmitter half 56.

The clamp 96 is formed like clamp 94 and has grooves on its legs 112 and 114 engaging the cantilever portions 74 and 92, respectively, of lugs 70 and 88.

Referring to FIG. 5, a cover plate 116 bridges the transmitter halves 54 and 56 and has its inner edge resting on shoulders 118 and 120 formed, respectively, on inner walls 58 and 76. A screw 122 extends through the cover plate 116 and into a threaded hole 104 in clamp leg 98. Similarly, a screw 124 extends through cover plate 116 and into threaded engagement with the threaded hole 106 in clamp leg 100.

Figure 16:
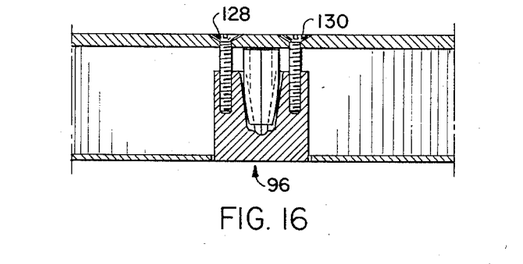
FIG. 16, a section taken along the line 16—16 in FIG. 5 and illustrating a portion of the elements employed to assemble the transmitter.

The closure of the transmitter is completed by a second cover plate 126, having a shape similar to the cover plate 116, positioned with its inner edge resting on the shoulders 118 and 120. Screws 128 and 130 extend through the cover plate 126 and into the legs 112 and 114 of clamp 96 as seen in FIG. 16.

As seen in FIG. 2, a plurality of circumferentially-spaced screws 132 extend radially inwardly through the outer walls 60 and 80 and into threaded engagement with holes in the cover plates 116 and 126 further to provide a rigid but releasable assembly of the transmitter.

Referring to FIGS. 4, 7 and 10 to 15, the electronic circuitry within the transmitter will now be described. For clarity, the lead wires have not been shown in FIG. 7 but it will be apparent from the other figures and the description how the wires should be connected.

Figure 4:
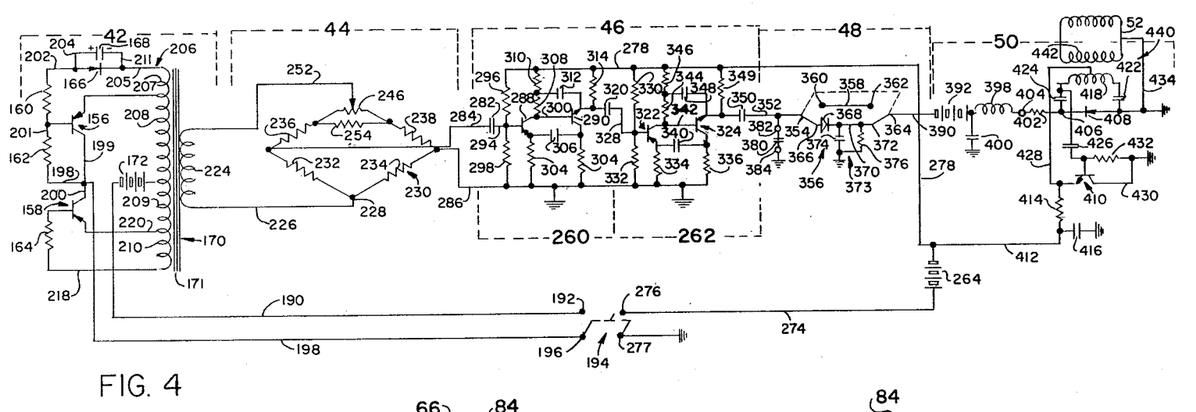
FIG. 4, a schematic circuit diagram of the transmitter shown in FIG. 2.
Figure 12:
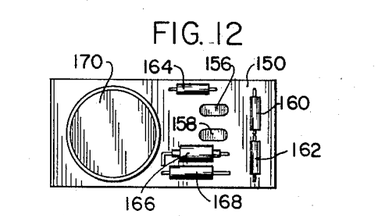
FIG. 12, a fragmentary section taken along the line 12—12 in FIG. 7 and illustrating the square wave generator circuit card.
Figure 13:
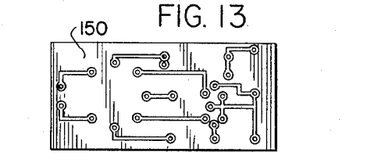
FIG. 13, a bottom view of the square wave generator circuit card shown in FIG. 12.
Figure 14:
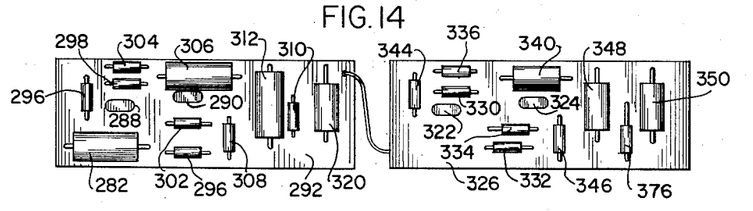
FIG. 14, a fragmentary section taken along the line 14—14 in FIG. 7 and illustrating the two amplifier circuit cards.
Figure 15:
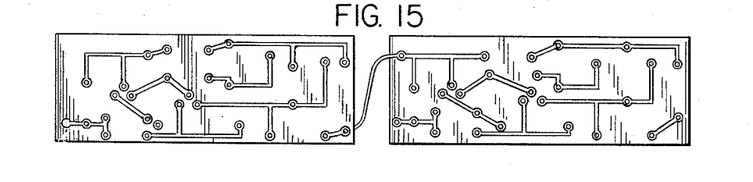
FIG. 15, a bottom view of the amplifier circuit cards shown in FIG. 14.

The square wave generator 42 generates an alternating current at about 1000 cycles per second and is mounted on the card 150 secured to the inner surface of outer wall 60 by four end posts 152 located at the four corners of rectangular card 150 and a centerpost 154 located substantially at the center of card 150.

The following elements are secured to the square wave generator card 150. A first transistor 156 and a second transistor 158 act as off and on switches. A first resistor 160, a second resistor 162, and a third resistor 164 serve to limit the voltage applied to the bases of the transistors. A diode 166 and a capacitor 168 cooperate with resistor 162 to cause an initial unbalance of the circuit and commence oscillation. A toroidal transformer 170 couples the square wave generator 42 to the strain gauge bridge 44 and has a nickel-iron alloy core 171 of high permeability.

The square wave generator 42 is powered by a 9-volt battery 172 releasably held between side clamps 174 secured to the rear plate 62, as seen in FIG. 7. A front contact plate 176 and a rear contact plate 178 also engage the battery 172. Further to hold the battery 172 in position, a stub post 180, seen in FIG. 5, is mounted in cover plate 116 and extends inwardly therefrom.

A lead 190 extends from the rear contact plate 178 engaging the battery 172 to a pole 192 of a double-pole switch 194. The opposite pole 196 is connected by a lead 198 to the resistor 162 and by leads 199 and 200, respectively, to the bases of transistors 156 and 158. A lead 201 connects the resistor 162 with the resistor 160.

A lead 202 connects the resistor 160 with the diode 166. A lead 204 extends from a junction with lead 202 to the capacitor 168. The diode 166 is connected by lead 205 to one end of the primary coil 206 of transformer 170. The primary coil 206 includes four portions 207, 208, 209 and 210. The capacitor 168 is connected by lead 211 to lead 205. The base of transistor 156 is connected to lead 201. The emitter of transistor 156 is connected to the primary winding 206 of transformer 170. The collector of transistor 156 is connected by leads 199 and 200 to the collector of transistor 158. The base of transistor 158 is connected to the resistor 164 which has its opposite end connected by lead 218 to one end of the primary winding 206 of transformer 170. The emitter of transistor 158 is connected by lead 220 to an intermediate point on primary winding 206 of the transformer 170.

The square wave alternating current generated by generator 42 is amplitude-modulated by a strain gauge bridge 44. The square wave appears in a secondary coil 224 of transformer 170. One terminal of the secondary transformer coil 224 is connected by lead 226 to junction 228 of a modified Wheatstone bridge arrangement generally indicated by the numeral 230.

The Wheatstone bridge arrangement 230 includes four strain gauges 232, 234, 236 and 238. Strain gauges of the type described in Simmons patent 2,292,549 can be employed. Strain gauges 236 and 238 provide temperature compensation and act as two identical legs of the bridge circuit. These strain gauges 236 and 238 are located inside the transmitter and are encased in wax on a plate 240 secured, as seen in FIG. 7, to the inner wall 58 at one end by a post 242. The plate 240 is a piece of mild steel having a temperature coefficient about the same as the average shafts, such as 24, to be tested.

The opposite end of the plate 240 is secured to the inner wall 58 by a pair of screws 244 that extend through the wall 58, the plate 240, and through a tapped resistor 246. A nut 248 is secured to the end of each screw 244. The strain gauges 232 and 234 are located outside the housing of the transmitter and are adhesively secured to the rotating shaft 24, as seen in FIG. 1, along helical lines extending at 45-degree angles to the axis of the shaft 24. The leads to the strain-sampling gauges 232 and 234 pass out of the transmitter housing through aperture 249 shown in FIG. 6. The arrangement of the four strain gauges 232, 234, 236 and 238 in the form of a modified Wheatstone bridge circuit compensates approximately for temperature changes.

Alternatively, all four strain gauges could be mounted on shaft 24, thus increasing signal output.

To complete the connection of the square wave generator 42 to the strain gauge bridge 44, the upper end of transformer secondary coil 224 is connected by a lead 252 to the tapped resistor 246 having a resistance of 10 ohms. A 1-ohm resistor 254 is connected between opposite ends of strain gauges 236 and 238 to reduce the sensitivity of the strain gauge bridge.

Figure 8:
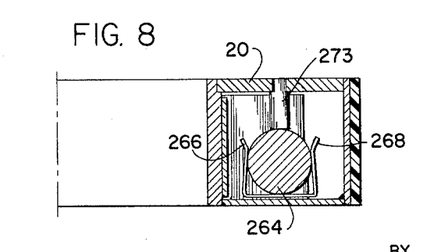
FIG. 8, a transverse section along the line 8—8 in FIG. 5.

The modulated signal from the strain gauge bridge 44 is amplified by an amplification factor of about 15,000 in audiofrequency amplifier 46 including two identical halves 260 and 262. Power is supplied to the amplifiers from 9-volt battery 264 releasably held in transmitter half 56, as seen in FIG. 7, by side clamps 266 and 268. Contact plates 270 and 272 engage the opposite ends of battery 264. A stub-post 273 is mounted in cover plate 126, as seen in FIGS. 5 and 8, and extends inwardly to engage battery 264 and hold it in position. A lead 274 extends from contact plate 272 to pole 276 of switch 194. The pole 277 of switch 194 is grounded. A lead 278 extends from contact plate 270 contacting the negative electrode of battery 264 to supply voltage to the amplifier halves 260 and 262.

The first amplifier half 260 is coupled to the previous strain gauge bridge 44 through a capacitor 282 having a capacitance of 50 microfarads and inserted in the line 284. A lead 286 provides the second line between the strain gauge bridge 44 and the amplifier 46. A first transistor 288 of the 2N185 type and a second transistor of the 2N366 type are provided on the first amplifier card 292 secured to the wall 80 by posts 293. A lead 294 connects capacitor 282 to transistor 288. A 30 kilo-ohm resistor 296 connects lead 294 to lead 278. A 10 kilo-ohm resistor 298 connects lead 294 to ground. The collector of transistor 288 is connected by lead 300 to the base of transistor 290. The emitter of transistor 288 is connected to ground by a 10 kilo-ohm resistor 302. Similarly, the collector of transistor 290 is connected to ground by a 27-ohm resistor 304. A 50 microfarad capacitor 306 extends between the emitter of transistor 288 and the collector of transistor 290. Two 10 kilo-ohm resistors 308 and 310 connect the lead 300 to the lead 278. A 50 microfarad capacitor 312 extends from a point between the two resistors 308 and 310 to the emitter of transistor 290. A 10 kilo-ohm resistor 314 extends from the emitter of transistor 290 to the lead 278.

The first amplifier half 260 is coupled to the second amplifier half 262 by a 50 microfarad capacitor 320 having its forward end connected to the emitter of transistor 290. The second amplifier half 262 includes a transistor 322 of the 2N185 type and a transistor 324 of the 2N366 type mounted on card 326. A lead 328 connects the capacitor 320 with the base of transistor 322. A 30 kilo-ohm resistor 330 connects the lead 328 with the lead 278. A 10 kilo-ohm resistor 332 connects the lead 328 to ground. A 10 kilo-ohm resistor 334 connects the emitter of transistor 322 to ground. Similarly, a 27-ohm resistor 336 connects the collector of transistor 324 to ground. A 50 microfarad capacitor 340 connects the emitter of transistor 322 to the collector of transistor 324. Two 10 kilo-ohm resistors 344 and 346 connect the lead 342 to the lead 278. A 50 microfarad capacitor 348 extends from a point between the two resistors 344 and 346 to the emitter of transistor 324. A 10 kilo-ohm resistor 349 extends from the emitter of transistor 324 to the lead 278.

The amplified amplitude-modulated signal is passed to a by-passable rectifier circuit 48. A 50 microfarad capacitor 350 couples the amplifier 46 to the rectifier circuit 48. A lead 352 extends from the capacitor 350 to a pole 354 of a switch 356. The switch includes an alternating current transmission line 358 for transmitting alternating current through the circuit when the switch 356 is thrown so as to connect the pole 354 with the pole 360 and the pole 362 with the pole 364.

Alternatively, the switch 356 can be thrown so as to connect the pole 354 with a pole 366 leading to a rectifier diode 368 located on oscillator card 369 and adapted to rectify alternating current to direct current. A lead 370 extends from the diode 368 to a pole 372 connectible to pole 364. A filter or integrating circuit 373 is employed including a 50 microfarad capacitor 374 and a 10 kilo-ohm resistor 376, both connected to ground and to two spaced points on lead 370.

For clipping off the negative half-cycles, a diode 380 is connected to lead 352. Two test jacks 382 and 384 are positioned on opposite sides of the diode 380. Diode 380 is connected across the two test jacks 382 and 384 in a position so that when ground side becomes positive the diode 380 will conduct. During this negative half of the cycle, diode 368 is cut off or non-conducting. During the positive half of the cycle, diode 368 will conduct and pass current to the integrator circuit 373.

The output from the rectifier 48 is passed to a voltage-tunable radio frequency oscillator circuit 50. In the oscillator a lead 390 extends from pole 364 to the negative pole of a 4-volt biasing battery 392 releasably held between clamps 394 and 396 on the rear plate 62 of transmitter half 54, as seen in FIG. 7. A stub-post 397, seen in FIG. 5, is mounted in cover plate 126 and extends inwardly to engage the battery 392 to maintain the battery in position. The positive pole of the biasing battery 392 is connected to a choke coil 398 having an inductance of 1 millihenry. A 0.01 microfarad capacitor 400 extends from a point between the battery 392 and the choke coil 398 to ground. The opposite end of the choke coil 398 is connected to a 10 kilo-ohm resistor 402. A test jack 404 is positioned between the choke coil 398 and the resistor 402. A lead 406 extends from the resistor 402 to a silicon diode 408 which functions as a diode capacitor with reverse voltage applied. In order to obtain the proper capacitance in the diode 408, the 4 volt battery 392 is connected in series with the diode 408 and the output of the rectifier unit 48.

Figure 4A:
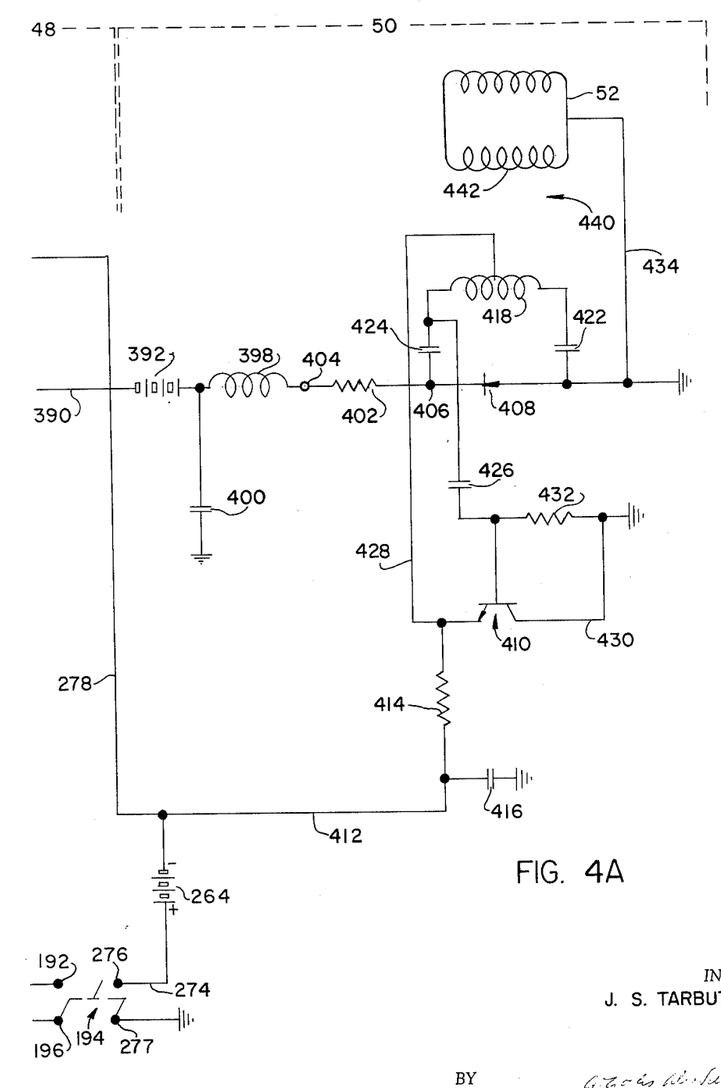
FIG. 4A is an enlarged view of the oscillator portion of FIG. 4.

The oscillator 50 also includes a transistor 410 of the type designated N-366. Power is supplied to the transistor 410 from battery 264 through a lead 412 and a 20 kilo-ohm resistor 414. A 50 microfarad capacitor 416 connects the lead 412 to ground. An oscillator coil 418 is connected across the diode through two capacitors 422 and 424. The base of transistor 410 is connected through an 0.01 microfarad capacitor 426 to a point between capacitor 424 and choke coil 418. A lead 428 extends from an intermediate point on choke coil 418 to the emitter of transistor 410. A lead 430 grounds the collector of transistor 410, and the base of transistor 410 is connected to ground through a 10 megohm resistor 432.

The output of the oscillator is passed to antenna 52 by the mutual inductance of a transformer 440 formed by oscillator coil 418 acting as a transformer primary coil and secondary coil 442 in series with radiating antenna coil 52.

The method of the invention and the operation of the apparatus will now be described.

Bushing halves 36 and 38 of an appropriate size are selected so that they will tightly engage the outer surface of a rotating shaft 24, which is to be studied regarding strain characteristics varying with load and speed. The bushing halves are inserted with a tight friction fit into the central opening in the transmitter housing 32 so as to be gripped by the inner surfaces of the inner walls 58 and 76. The assembled transmitter is then slid onto the shaft 24 which passes through the apertures 40. The strain gauges 232 and 234 are then secured to the shaft 24 along 45 degree helical lines. The switch 194 is closed and the switch 356 is closed to the desired position so that the rectifier 48 will either pass alternating current, or rectify, as desired. The motor 26 is started to apply a load to the shaft 24. The strain on the strain gauges 232 and 234 produces changes in the resistances thereof, which amplitude modulates the signal produced by the square wave generator 42.

The square wave generator 42 operates in the following manner. Resistance 162 biases the base of transistor 156 and transistor 156 conducts current. The current in primary coil portion 208 increases and the flux in core 171 increases. The counter voltage generated in primary coil portion 208 limits the current just as an inductance would. The core 171 saturates quickly and retains practically all of the flux after removal of the magneto-motive force. As the flux is increasing, due to the current increase in primary coil portion 208, the voltage induced in primary coil portion 207 is of such polarity that the transistor 156 is driven to conduct more. Further, the voltage across primary coil portion 207 is in such a direction that the diode 166 conducts, and transistor 156 is biased to conduct more, as capacitor 168 charges. The voltage across primary coil portion 210 is of such polarity that transistor 158 is cut off or non-conducting. This continues until saturation is reached.

At saturation, the voltage across primary coil portion 207 decreases to zero, and transistor 156 ceases to conduct. At this point, with a slight decrease in flux, the voltage across primary coil portion 210 becomes of such polarity that transistor 158 begins to conduct. Capacitor 168 discharges through diode 166, thus producing a voltage that opposes the effects of resistance 162 and renders transistor 156 completely cut off or non-conducting. The current flow to transistor 158 further decreases the flux until saturation is reached in the negative direction.

By this action, the secondary coil 224 of transformer 170 has developed in its winding a voltage having a square wave form. The frequency of this voltage is dependent upon the supply voltage of battery 172. As the supply voltage is increased, the core 171 will saturate more quickly and increase the frequency. In designing the circuit, the number of primary turns and the flux density necessary to saturate the core are parameters of the frequency.

This signal, amplitude-modulated by strain gauge bridge 230, is then amplified by the two-stage amplifier 46.

Since the two amplifier halves 260 and 262 are identical, only the operation of the first half 260 will be described in detail. Transistor 288 is connected as a common-collector stage and corresponds roughly to a common-cathode vacuum tube amplifier. This stage is directly coupled to transistor 290, the common-collector stage, which corresponds to a cathode-follower amplifier.

To aid in analyzing the direct current voltages and currents, consider capacitors 306 and 312 removed. The base bias level of transistor 288 is determined by the voltage, made up of the voltages across the 30 kilo-ohm resistor 296, the 10 kilo-ohm resistor 298 and the 10 kilo-ohm emitter resistor 302. A very small base current flows into the base of transistor 288 as compared to the current in the voltage divider.

The base voltage will be approximately one-fourth of the supply voltage, with respect to ground, or $-2.25$ volts. The voltage across the base-emitter junction of transistor 288 is approximately 0.1 volt. Therefore the voltage across the 10 kilo-ohm emitter resistor 302 is $-2.15$ volts, with respect to ground. This voltage determines the emitter current, which is approximately 0.215 milliampere.

The base current is only about one percent of the emitter collector current, therefore the emitter collector current would be approximately 0.214 milliampere. This current determines the voltage across the two 10 kilo-ohm resistors 308 and 310 in the collector circuit, which would be about 4.28 volts. The sum of this voltage (4.28 volts) and the emitter resistor voltage (2.15 volts) subtracted from the supply voltage (9 volts) gives the voltage across the transistor 288, which is 2.57 volts approximately. The base current of the transistor 290 has been neglected. An interesting feature of this system of biasing is that the voltage across the transistor (collector to emitter), and the collector current, are set by the circuit, and are almost independent of the parameters of the transistor. Therefore, the operating point of the transistor 288 does not vary appreciably with different transistors or with temperature. The operation of the transistor is not sensitive to direct current supply voltage variations because the circuit adjusts itself to provide proper voltage distribution. It can be seen that the emitter resistor acts to limit collector current just as does the cathode resistor in a vacuum tube circuit.

The base voltage of the second transistor 290 is fixed by the collector voltage of transistor 288 and is approximately $-4.28$ volts with respect to ground. There would be about 0.1 volt drop across the emitter-base junction of transistor 290. Therefore the voltage at the emitter of transistor 290 is about $-4.38$ volts with respect to ground. The voltage across the 10 kilo-ohm (emitter) of transistor 290 is approximately $-4.62$ volts with respect to ground, and the emitter current of transistor 290 is approximately 0.462 milliampere. The direct current voltage across the 27 ohm collector resistor 304 of transistor 290 is very small. Therefore the voltage across transistor 290 is approximately 4.38 volts. The voltage and the current of the transistor are fixed by the circuit external to the transistor. This is important for direct current stability.

Considering the amplifier half 260 from an alternating current standpoint, conceive the 27 ohm resistor 304 as removed. If the frequency is high enough, the capacitors 306 and 312 are effectively short-circuited, and the biasing 10 kilo-ohm and 30 kilo-ohm resistors can be neglected. With this configuration of the circuit, the output impedance of the common collector stage (which includes a transistor 290) is low, approximately 5000 ohms, as determined by the emitter resistance, i.e., the two 10 kilo-ohm resistors in parallel. This is a desirable condition. The input impedance to the emitter follower is very high, approximately 5000 ohms×beta, or about four or five hundred thousand ohms. The input to the emitter follower is the collector load of the transistor 288. Since the load of the first transistor 288 is very high, the gain of the first stage will be very high (perhaps 700 to 1000). Although the voltage gain of the emitter follower is slightly less than one, it is able to transfer the very large collector voltage gain of the first stage to the output terminals at a relatively low level. The 10 kilo-ohm resistor shunting the base emitter junction of the second transistor 290 decreases the input impedance of the second stage, but very little, because it is shunting a very small voltage. The gain of this amplifier, with the 27 ohm collector resistor 304 shorted, is from about 700 to 1000, but it will vary widely with transistors and with temperature. This is undesirable in a precision measurement device.

Now consider the 27 ohm resistor 304 back in the circuit. But still consider the capacitors 306 and 312 as effecting short circuits. It will be noted that both the emitter current of transistor 288 and the collector current of transistor 290 are in phase, and produce a voltage drop across the 27 ohm resistor 304 which opposes the signal voltage with respect to the base-emitter junction of transistor 288. This negative feedback has the effect of stabilizing the gain of the amplifier, and raising the effective input impedance of the first stage. The impedance of the amplifier should be in the neighborhood of 5000 ohms, about the same as the output impedance.

This feedback will reduce the over-all gain and it will probably stabilize at about 125. This value should be expected from each half of the amplifier. Therefore the overall gain of the amplifier system should be in the range of 15,000 which will assure a stable high gain amplifier.

The output of the amplifier 46 feeds a square wave to the rectifier 48 which removes the negative half of the cycle when the switch 356 is thrown to the lower position with diode 368 in the line. During rectification, diode 380 is connected across the two test jacks 382 and 384 in such a position so that when the ground side becomes positive the diode 380 will conduct. During the positive half of the cycle, diode 380 does not conduct. Thus, the diode 380 functions as a clamper to require the base line of the pulse wave formed to remain at a fixed voltage. However, diode 368, which has been cut off, will now conduct and pass current to the integrating filter circuit 373 including capacitor 374 and resistor 376. For this operation, the switch 356 is thrown to put the diode 368 in the line between the amplifier 46 and the oscillator 50. The time constant of the filter 373 is $RC = 10,000 \times 50 \times 10^{-6} = 0.5$, a large time constant compared to the time of one cycle. For a source of 1000 cycles per second the time of one cycle is only 0.001 second. The use of a 1 microfarad results in a time constant of $10,000 \times 10^{-6}$ or 0.01. With this value, a considerable amount of the 1000 cycle signal is audible on the received radio signal.

The double-pole double-throw switch 356 is so arranged that the diode 368 and its associated filter or integrator circuit can be eliminated from the circuit. This arrangement makes it possible to feed the alternating current voltage directly to the radio frequency oscillator 50, thereby making the transmitter dual, so that when the switch is in alternating current position rapid changes in strain can be detected.

When the switch 356 is thrown to the upper position shown in FIG. 4, wherein the lead 358 is in the line from amplifier 46 to oscillator 50, the frequency response of the radio frequency oscillator follows instantaneously the variation of strain of strain gauges 232 and 234. Under these conditions, differential or minute changes in strain are detected by the receiver 22. No filtering is active and the 1000 cycle square wave which is impressed on the bridge circuit 230 originally is fed into the oscillator circuit 50 after amplification and there modulates the frequency of the carrier wave generated by oscillator 50. The frequency modulated wave is then radiated by antenna 52. To receive and detect such a signal, a fast-acting, phase-conscious indicator is needed.

When the switch 356 is in the lower position shown in FIG. 4, or the direct current position, and the line extends through diode 368, with the filter 373 in effect, an average value of strain on the strain gauges 232 and 234 is represented by the voltage output of the filter system. The filter circuit 373 integrates the peak values of the pulses.

The radio frequency oscillator 50 is a typical transistor Hartley oscillator employing a unique feature in that the frequency of oscillation is controlled by means of a voltage-tunable capacitor in the form of a semiconductor silicon diode 408 which is reverse biased.

Transistor 410 is a type NPN and is emitter bias controlled. When switch 194 is closed, the emitter of transistor 410 becomes negative or forward biased and the collector becomes reverse biased in normal fashion. Lead 430 connects the collector to the position terminal of battery 264 through ground to provide this reverse bias voltage on the collector.

A path of direct current flow is established from the positive terminal of battery 264, through switch 194, ground, resistor 432, the base and emitter of transistor 410, resistor 414 and the negative terminal of battery 264. With current flow in this fashion in the emitter-base circuit of transistor 410, current also flows from the collector of transistor 410 through resistor 432 and the base back to the collector in normal NPN transistor fashion. The voltage drop established across resistor 432 by this current puts the collector at a higher positive potential than the base and is therefore necessary to provide the proper potential difference between collector and base for reverse bias on the collector. The collector-base voltage of transistor 410 thus appears across resistor 432. Resistor 414 is also a voltage dropping resistor to provide the proper value of negative voltage on the emitter for the desired operating point.

When switch 194 is closed, there also is a surge of current solely through passive elements, i.e., without the interposition of electronic tubes or the like, from the positive terminal of battery 264 through ground, to diode 408 which is acting as a capacitor because of reverse biasing from battery 392. Resistor 402 is a voltage dropping resistor to provide for the proper value of this reverse bias voltage on diode 408. This current surge charges capacitor (diode) 408, with the ground end of the diode becoming positive. This current is also carried by coil 418. The current induces a voltage in coil 418 and makes the top of lead 428 on the coil negative with respect to the end of the coil connected to capacitor 422 and thus renders the emitter more negative with respect to the base of transistor 410. This increases the transistor conductivity and allows capacitor (diode) 408 to charge to a potential almost equal to the collector-base voltage of transistor 410. As voltage across capacitor (diode) 408 increases, current through coil 418 decreases, causing a decrease in voltage induced in coil 418 and allowing capacitor (diode) 408 to discharge through coil 418. Thus current oscillation in the tank circuit is begun. Energy stored in coil 418 is then returned to capacitor (diode) 408 in typical tank circuit fashion, causing a reversal of current flow in the tank circuit. This drives the emitter less negative and cuts off the transistor collector current flow during this second-half cycle of tank current. The tank circuit can now oscillate, and, each half cycle, energy lost in the tank circuit is replenished by energy from battery 264 during a conduction period when the transistor emitter is driven negative by regenerative feedback from the tank circuit through lead 428. Collector current pulses occur then at radio frequency and these pulses which replenish energy lost in the tank circuit have a radio frequency path from the collector of transistor 410 through lead 430, ground, the tank circuit, capacitor 426, the base and back to the collector of transistor 410, and thus oscillation is maintained. Oscillation, therefore, is accomplished in conventional fashion with the exception that diode 408 serves as the tunable capacitor of the tank circuit.

Capacitor 416 serves as a low frequency reactance path for the radio frequency energy from the tank circuit to bypass it from the supply.

Radio frequency choke 398 and capacitor 400 serve as a decoupling network to prevent radio frequency energy from the tank circuit from reaching the supply through battery 392.

With no modulating current flowing through battery 392, choke coil 398, and resistor 402, reverse bias voltage on diode 408, as provided by battery 392, is of a value to cause diode 408 to exhibit the proper value of capacitance to cause the tank circuit to oscillate at the desired center frequency. A value of modulating current through battery 392, choke coil 398, resistor 402 and diode 408 changes the value of reverse bias voltage on diode 408, changing the value of capacitance of capacitor (diode) 408 and thus causing a shift in the frequency of oscillation of the tank circuit. Frequency modulation is thus achieved, the shift in frequency being proportional to the amplitude of the modulating signal. The energy of the tank circuit is coupled to antenna coil 52 by mutual inductance between coils 418 and 442 (transformer 440). Lead 434 serves to ground one end of the antenna coil in order that voltage from the tank circuit may be developed across the antenna coil.

Twin capacitors 424 and 422 serve to isolate batteries 392 and 264 from the emitter of transistor 410. The absence of these capacitors would allow positive D.-C. potential on the emitter which would render transistor 410 inoperative. Also, the absence of twin capacitors 424 and 422 would allow D.-C. current from battery 392 to bypass diode 408 through coil 418 and prevent reverse bias voltage from being applied to diode 408. Capacitors 424 and 422 therefore serve the additional purpose of isolating diode 408 for proper operation.

Capacitor 426 prevents the emitter and base of transistor from being at the same D.-C. potential which would prevent proper transistor action.

The battery 392 provides a 4-volt bias to the diode 408 before the signal is applied. The diode 408 is an International Rectifier Corporation type 66–1740 with a capacity range of 36 to 550 microfarads for 20 to 0.1 volt direct current.

The voltage tuned oscillator 50 has a wide frequency variation and nominal voltage variation. When the voltage is changed from a minimum of 0.02 volt to a maximum of 9 volts, a frequency change of 155 kilocycles is produced. With the operating bias of 4 volts applied by battery 392, a 1 volt positive increase in voltage produces a frequency shift of almost 25 kilocycles.

The modulated signal from the oscillator 50 is passed through the transformer 440 to the antenna 52 wrapped around the outer surface of the transmitter.

The signal is received by frequency meter 22 which is tunable and easily calibrated with the crystal oscillator. Head phones can be used to detect the zero beat. Frequently radio interference from sparking brushes, etc., render the radio frequency signal from the transmitter on the shaft 24 indiscernible. Under these conditions, employing a "Panadapter" facilitates visual alignment of the two signals; that is, the signal from the transmitter on the shaft and the signal from the frequency meter. When individual signal peaks of the screen of the Panadapter coincide, the frequency meter is tuned to the frequency of the unit on the shaft. A radio can also be employed as auxiliary receiving equipment. A tachometer can be employed to measure the rate of rotation of the shaft 24. Readings are obtained for various loads and speeds of the shaft 24 and graphs plotted displaying the trends in the structural characteristics of the shaft.

Among the other uses of the telemetering system mentioned is the telemetering of the acceleration of the rotating shaft. In such case, an accelerometer would be employed in conjunction with telemetering apparatus according to the invention.

Thus it will be seen that the invention provides a system for continuously, precisely and accurately communicating characteristics from a rotating member to a stationary receiver, whereby testing and inspection can be accomplished and trends observed.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. An electronic oscillator circuit comprising an inductance choke coil, a pair of capacitors each having one plate connected to opposite ends of said choke coil, a diode having its electrodes connected to the other plates of said two capacitors, a biasing battery having one pole connected passively to said diode, said diode affording the sole variable current flow path through the inductance.

2. An electronic oscillator circuit comprising an inductance coil, a solid state diode coupled with the ends of said inductance coil, a resistor, a transistor, the base of which is capacitively coupled to an end of said inductance coil and via said resistor to the collector of said transistor, a tap on said inductance coil connected to the emitter of said transistor and means for feeding a variable voltage to the diode in reverse direction.

3. The structure of claim 2 in which a battery, grounded at its positive end, has its negative end connected via a second resistor to the emitter of the transistor, the collector of the transistor being also grounded.

4. An electronic oscillator circuit comprising an inductance coil, a solid state diode coupled with the ends of the inductance coil, a resistor, and a capacitor, a transistor having a base, collector and emitter with the base grounded and coupled to the collector through said resistor, said base being coupled to one end of the inductance coil via said capacitor, the emitter of said transistor being coupled to a tap on said inductance coil, a second resistor, a battery having its positive end grounded and coupled at its negative end via said second resistor to the emitter, means feeding a voltage to said diode in reverse direction comprising in part a biasing battery, a square wave generator, means for modulaitng the output of said generator and means for feeding the output of said generator, at will, directly to the diode in reverse direction via a D.C. voltage integrating circuit and the biasing battery.

5. The subject matter of claim 4 wherein the D.C. voltage integrating circuit includes a second diode shunting the output from the generator when in one direction from the generator to the ground and a third diode to feed the biasing battery, and an integrating network shunting the output from the third diode to the ground.

6. An electronic oscillator circuit for transmission from a rotating shaft comprising an inductance coil, a solid state diode coupled with the ends of the inductance coil, a resistor, and a capacitor, a transistor having a base, collector and emitter with the collector grounded and coupled to the base through said resistor, said base being coupled to one end of the inductance coil via said capacitor, the emitter of said transistor being coupled to a tap on said inductance coil, a second resistor, a battery having its positive end grounded and coupled at its negative end via said second resistor to the emitter, means feeding a voltage to said diode in reverse direction comprising in part a biasing battery having one terminal connected to said oscillator circuit and its other terminal connected to a circuit producing a signal, said inductance coil comprising the primary of a transformer the secondary of which is connected in series to a rotating antenna coil, and means to support the oscillator circuit and antenna coil on a rotating shaft with the antenna encircling the shaft.

7. The invention according to claim 6 which is responsive to a D.C. voltage in which a second diode is in circuit with the other terminal of said biasing battery to shunt the voltage in one direction to ground and a third diode is provided to feed the voltage to the said biasing battery.

8. An electronic oscillator circuit for transmission from a rotating shaft without adverse effect due to the rotation of the shaft comprising a battery having its positive terminal connected to ground and its negative terminal connected to a capacitor to ground and to a resistor having its other end connected to a tap of an inductance coil serving as a primary of a transformer, the said tap connection connected to the emitter of a transistor, the collector of such transistor being connected to ground, the base of such transistor being connected through a second resistor to ground and coupled through a capacitor to one terminal of said inductance, said one terminal of said inductance being connected through another capacitor and resistor to a jack connection for receiving a signal, the last named resistor and capacitor being connected to a solid state diode serving as a capacitor, the other terminal of said diode being connected to ground and connected through a capacitor to the other terminal of said inductance, said other terminal of said diode being connected to a common lead of a secondary of a transformer in coupled relation to said inductance and also connected to a coiled antenna in series with the secondary of said transformer with said antenna being coiled to extend in a circular path concentrically about the shaft on which the oscillator circuit is mounted, said jack connection serving to receive the input to the oscillator circuit.

References Cited by the Examiner
UNITED STATES PATENTS

| | | | |
|---|---|---|---|
| 2,182,377 | 12/39 | Guanella | 332—30 |
| 2,400,571 | 5/46 | Oleson | 340—201 |
| 2,469,569 | 5/49 | Ohl | 332—20 |
| 2,656,466 | 10/53 | Cherry | 331—177 |
| 2,724,821 | 11/55 | Schweitzer | 340—201 |
| 2,771,584 | 11/55 | Thomas | 331—177 |
| 2,856,529 | 10/58 | Mielke | 331—36 |
| 2,868,979 | 1/59 | Jensen | 331—177 |
| 2,915,631 | 12/59 | Nilssen | 332—30 XR |
| 2,936,428 | 5/60 | Schweitzer | 332—30 |
| 2,984,794 | 5/61 | Carter et al. | 332—30 |

ROY LAKE, *Primary Examiner.*

BENNETT G. MILLER, L. MILLER AUDRUS, ALFRED L. BRODY, *Examiners.*